United States Patent Office 2,828,307
Patented Mar. 25, 1958

2,828,307

PROCESS FOR THE PURIFICATION OF LACTAMS

Johannes C. Soeterbroek and Johannes A. Zeegers, Geleen, Netherlands, assignors to Stamicarbon N. V., Heerlen, Netherlands No Drawing. Application June 26, 1956
Serial No. 593,827

Claims priority, application Netherlands
November 15, 1952

12 Claims. (Cl. 260—239.3)

This application is a continuation-in-part application of applicants' copending application, Serial No. 390,716, now abandoned, filed November 6, 1953.

The present invention relates to lactams and, more particularly, to novel procedures for purifying contaminated lactams.

It is well known that lactams as obtained by, for example, Beckmann transformation of cyclic ketoximes, depolymerization of polyamides prepared from lactams or washing out polyamides, contain contaminations which cannot be completely removed, even if the lactam is subjected to repeated distillation. These contaminations produce discoloration in the lactam when the latter is exposed to light and air with the result that contaminated lactams are not suitable for the preparation of polymers, or shaped polymeric articles, e. g., fibers, films and other molded products.

As a result of the above-mentioned disadvantages, it has previously been proposed to subject lactams to various types of purification techniques. For instance, it is well known that contaminated lactams may be purified by distillation in vacuo after the addition of small amounts of substances showing alkaline or acid reaction or possessing oxidizing or reducing properties, for example, perborates, percarbonates, mixtures of zinc and sodium hydroxide solutions, or mixtures of zinc and sulfuric acid.

It has has also been proposed to purify lactams by heating same with oleum and, after neutralization, distilling the lactam which separates off.

All of the above-mentioned prior procedures suffer from certain disadvantages. For example, considerable losses of the lactam occur. Furthermore, distillation is an important feature of such procedures with the result that costly and complicated equipment must be utilized.

It has further been proposed in United States Patent No. 2,692,878, granted to Kahr, to purify lactams by treating them with anion exchange resins in an organic solvent. Specifically in Example 1, of this patent, impure E-caprolactam dissolved in a mixture of benzene and cyclohexane is subjected to a preliminary purification step of extraction with a 40% ammonium sulfate solution in water. A second purifying treatment is then carried out as described in Example 6 of the patent by subjecting the lactam solution obtained from the initial extraction to an adsorption treatment using initially a synthetic resin cation exchanger and subsequently, a synthetic resin anion exchanger as the adsorbent. This purification process is satisfactory so long as fresh portions of the ion exchange resins are employed. However, when the process is carried out in a continuous fashion, such that approximately 500 liters of lactam solution per hour are treated with the ion exchange resins, the capacity of the solid adsorbents rapidly decreases so that after a period of five hours, replacement with fresh amounts of ion exchange resin is required. The process has the further disadvantage that when the exhausted ion exchange resin adsorbents are subjected to the normal regeneration procedure of passing 500 liters of a one normal aqueous solution of sulfuric acid over 200 liters of the exhausted cation exchange resin, and by passing 500 liters of a one normal aqueous solution of sodium hydroxide over 200 liters of exhausted anion exchange resin, both of the ion exchange resins are recovered without any regeneration having taken place and remain unsuitable for further use as solid adsorbent means.

It is the principal object of the present invention to provide a novel and improved procedure for continuously purifying impure lactams whereby the above-mentioned difficulties are avoided.

A more specific object of the invention is to provide a lactam purifying process which so effectively eliminates contaminants from the lactam that the latter is free from any tendency to discolor upon exposure to air and light and is otherwise highly desirable for use in the production of polymers and polymeric products.

A further object of the invention is to provide a process for purifying contaminated lactams whereby all of the contaminating materials may be separated from the lactam with little, or substantially no, loss of lactam.

An additional object of the invention is to provide a lactam purifying process which requires the use of only relatively simple and inexpensive equipment and is otherwise highly desirable from a commercial standpoint.

A still further object of the present invention is to provide a process whereby impure lactam aqueous solutions in which non-ionogenic impurities have been converted to ionogenic impurities, are purified by treatment with cation and anion exchange resins whereby the ion exchange resins may be regenerated and re-used in the process.

The foregoing objects are realized, according to the present invention, by a process which involves the steps of providing an aqueous solution of the impure lactam and contacting this aqueous lactam solution with an anion exchanger and a cation exchanger.

The success of the invention is due, at least to a substantial extent, in the surprising discovery that many of the organic impurities which are difficult to remove from the lactams, possess sufficient ionogenic properties to permit their substantially complete removal by passing an aqueous solution of the impure lactam over cation and anion exchangers. This was not known to the prior art as is evidenced by the fact that prior to the present invention, it was believed necessary to use a distillation or adsorption purification technique. In this way, the impurities which normally cause discoloration of the lactam, are bound to the ion exchangers while the lactam remains in solution.

According to the invention, the concentration of the aqueous lactam solution may be varied over a wide range with satisfactory results. Thus, for example, lactam solutions varying in concentration from 5% to 60% by weight can be effectively purified by the present process. However, it is preferred that the lactam concentration not be too high, e. g. above 30%, since at such concentrations the organic impurities appear to be ionized to a lower degree with the result that the impurities are less strongly bound by the ion exchangers. The preferred range of concentration is 10% to 30% within which the best results are obtained.

Cation exchangers suitable for use according to the invention are e. g., ion exchangers containing strongly acid groups, such as sulphonated polymerization and polycondensation products, typically sulphonated polystyrene or sulphonated condensation products of phenols and aldehydes.

Suitable anion exchangers for use in the present process are, for example, tertiary sulfonium bases of high molecular weight, quaternary ammonium bases of high molecular weight such as polystyrene copolymers containing quarternary ammonium groups.

The aqueous lactam solution may be passed over the ion exchangers in any convenient fashion, for example, by passing the solution through columns filled with the ion exchangers. The order in which the solution is passed over the anion and cation exchangers may be chosen arbitrarily and it is also possible to use the cation and anion exchangers in a mixed bed. In the case where the ion exchangers are arranged in series, with the anion exchanger placed at the end, it is also desirable to use a pH-correction filter. Otherwise, when using a strong anion exchanger, the liquid coming off shows an alkaline reaction and there is a possibility that, in such alkaline medium, the lactams may be hydrolized into the corresponding aminoacids.

In the practice of the present invention, it is particularly convenient to use a continuous process rather than a batch process technique. In this manner, the continuously produced lactam solutions can be continuously purified without interruption in the general synthetic scheme to form a purified product.

The rate of passage of lactam solution over the cation and anion exchangers can be widely varied and depends upon other operating factors, e. g., concentration of lactam and nature of the ion exchange materials. However, generally speaking, on a volume basis, from 1 to 10 parts per volume of impure lactam solution may be passed per hour over each part per volume of ion exchanger to give the desired purification. However, it will be appreciated that rates outside the range stated may also be used to advantage. Using this technique, the purification treatment may be continued by day and by night for a period of time of at least one week with only a small decrease in activity of the synthetic ion exchange resin.

In order to bind certain small amounts of non-ionogenic impurities which may be present, use may moreover be made of one of the well-known surface-active substances such as active coal, bleaching earth, or other adsorptive agent. These substances may be used in the form of a filter bed positioned before or after the ion exchangers. However, it is usually preferred to use these surface-active substances before passing the liquid over the ion exchangers since in this way the physical adsorption by the ion exchangers of impurities which are often rather difficult to remove from the ion exchangers is reduced. If used after the ion exchangers, care should be taken that the adsorption agent does not introduce new ions, although, if necessary, a further ion exchanger treatment may be given to the lactam solution to eliminate any ions picked up from the adsorption agent.

As will be appreciated, the ion exchange resins may be regenerated in any convenient way after having become contaminated with lactam impurities. Thus, for example, 200 liters of the cation exchange resin may be regenerated by treating it with 500 liters of a one normal aqueous solution of sodium hydroxide. By such regeneration treatments, the original capacity of the ion exchange resins is re-established and they may be used again in the continuous purification process.

After passage of the lactam solution over the cation and anion exchange materials, the lactam may be recovered from the treated lactam solution in the conventional manner by evaporation of water, preferably under reduced pressure.

In another embodiment of the invention, which is of particular advantage, the lactam may be subjected to a reducing or oxidizing treatment prior to the purification process with the ion exchange resins. In this manner, the surprising result is achieved that the non-ionogenic impurities are converted into ionogenic impurities without harmful effect to the lactam. Particularly suited for this purpose is the oxidation in a homogeneous non-aqueous medium whereby the non-ionogenic impurities are converted into ionogenic impurities. As an example of a suitable oxidizing agent, potassium permanganate may be mentioned, although other oxidizing agents of similar activity may also be used, such as sodium or potassium persulfate, chromic anhydride, etc. The lactam may alternatively be subjected with advantage to a reduction treatment with, for example, sodium metasulfite or aluminum amalgam.

As will be appreciated, the purification of lactams by passing them in aqueous solution over ion exchangers, if desired in combination with adsorption agents described above, according to this invention, offers a considerable number of advantages over the purification methods previously known. For example, since the impurities are removed practically quantitatively by the process of the invention, a distillation of the lactam is avoided in many cases. Thus the lactam may be obtained as a dry substance or, if desired, as a 90% aqueous solution and can be utilized as such with, if desired, the addition of a stabilizer. The losses in lactam thus remain limited to the minimum amount, while at the same time an excellent product free of any tendency to discolor is obtained. It will further be appreciated that by the use of the present invention, the ion exchange purification means may be regenerated and re-used, thereby resulting in an improved economy in the process.

Without intending to limit the invention thereto, it will be further explained with the help of a number of examples.

Example I

Brownish-yellow E-caprolactam was dissolved in water to form a 50% solution. This solution was successively passed through a column filled with Dowex–50 (a strongly acid ion exchanger consisting of sulphonated styrene polymer) and a column filled with Dowex–2 (a strongly basic ion exchanger consisting of a styrene copolymer containing quaternary ammonium groups.)

The E-caprolactam solution removed was as clear as water. After neutralization through a pH-correction filter this solution was evaporated. The resulting E-caprolactam was still absolutely colorless after it had been kept for four months. In addition, polymer prepared from this purified lactam showed no tendency to discolor.

Example II

At the rate of 2 parts by volume of solution per part by volume of ion exchanger per hour a 20% aqueous solution of highly impure E-caprolactam was passed continuously and successively through a column filled with Dowex-50, a column filled with Dowex-2 and a correction filter of Dowex-50. After it had passed through the column of Dowex-2 the solution appeared to have a pH value of 9.5, which was reduced to 7.5 by the correction filter.

The aqueous E-caprolactam solution was withdrawn from the correction filter and evaporated. The recovered caprolactam appeared to be completely colorless and stable to color change. After about 400 parts by volume of solution had been passed through one part per volume of ion exchanger, the latter exhibited decreased activity. The cation and anion resins could be easily and completely regenerated by treating them with 2½ parts by volume of a one normal sulfuric acid solution and a one normal sodium hydroxide solution, respectively.

Example III

A yellow 20% aqueous solution of delta-methylvalerolactam obtained by a Beckmann rearrangement of alpha-methylcyclopentanone oxime was passed continuously and successively through a column filled with Dowex-2, a column filled with Dowex-50, and a column filled with previously washed active charcoal. After having passed through these three columns the solution was clear and colorless. After evaporation of the aqueous solution, caprolactam was obtained in practically quantitative yield. This delta-methylvalerolactam did not show a tendency to discolor on storage, neither in the monomeric nor in the polymeric form, and the polymerizing properties thereof were excellent.

Example IV

A 20% aqueous solution of crude delta-methylvalerolactam was continuously passed through a column filled with a mixture of equal parts of volume of Dowex-2 and Dowex-50. The feed rate of the solution amounted to 8 parts by volume of solution per part by volume of mixed ion exchanger per hour. After having passed through this column the solution was clear and practically neutral. After evaporation of the aqueous solution a delta-methylvalerolactam of excellent quality similar to that obtained in Example III was recovered in nearly quantitative yield.

Example V

During the neutralization of a E-caprolactam solution obtained from cyclohexanone oxime by the Beckmann transformation enough benzene was added to give a 20% solution of the lactam in benzene. The water dissolved in the benzene solution was removed by treatment with solid caustic alkali. Subsequently an amount of 3 grams of $KMnO_4$ in the form of a saturated aqueous solution was added per kg. of solution. A 30-minute boiling treatment in a flask with reflux cooler followed, after which the water present was distilled off as an azeotropic mixture with benzene. After filtration of the solution distillation was carried out to remove benzene and then sufficient water was added to form a 20% aqueous solution of caprolactam.

After cooling, the resulting solutions were passed through columns which were filled respectively with active coal, Dowex-50, Dowex-2, and Dowex-50.

The solution was then evaporated to dryness, lactam being obtained in very high yields. This lactam was completely pure and color-stable.

Example VI

To a 20% solution of E-caprolactam in benzene saturated with water 5 grams of solid sodium metasulphite was added per kg. of solution. The solution was then boiled with reflux cooling during 1 hour after which the water present was eliminated by treating with solid sodium hydroxide. After filtration of the solution distillation was carried out to remove benzene while adding sufficient water to form a 20% aqueous solution of E-caprolactam.

After cooling, the resulting solution was passed through columns filled respectively with active coal, Dowex-50, and Dowex-2.

After evaporating the solution to dryness, E-caprolactam was obtained in high yield, which E-caprolactam was of similar excellent quality.

Example VII

A solution of delta-valerolactam obtained by Beckmann rearrangement of cyclopentanone oxime was dissolved in benzene to give a 20% solution of the lactam. An amount of 5 grams of potassium persulfate in the form of a saturated aqueous solution was added per kilogram of the lactam solution. The resulting solution was heated under reflux for 30 minutes after which the water present was removed by azeotropic distillation with benzene. The solution was then filtered, the benzene removed by distillation and sufficient water added to make up a 20% aqueous solution of the valerolactam.

The resulting solution was then passed through columns filled respectively with active coal, Dowex-50, Dowex-2, and Dowex-50 in the manner of Example 5. The purified solution was then evaporated to dryness and pure valerolactam recovered in nearly quantitative yields. The product was colorless and remained color-stable on storage for several months.

Example VIII

A 20% aqueous solution of E-caprolactam was prepared and stirred with a 2% aluminum amalgam for one-half hour after which the aqueous solution was separated from the amalgam. The solution was filtered and then passed through columns filled respectively with Dowex-50 and Dowex-2 at the rate of two parts by volume of the solution per part by volume of ion exchanger per hour. The resulting solution was evaporated to dryness and the lactam recovered in nearly quantitative yield. The product was of the same excellent quality as that obtained from example 6 and showed similar color stability on storage.

Example IX

An impure 20% aqueous solution of butyrolactam prepared from a Beckmann rearrangement of cyclobutanone oxime was passed successively through columns filled with ion exchange resins in the manner of Example 3 and finally through a column filled with active coal. After having passed through the three columns, the solution was clear and colorless. The butyrolactam was then recovered by evaporation of the water under reduced pressure and the product showed excellent properties of stability over a period of several months under normal storage conditions. There is no tendency observed for the compound to discolor either in monomeric or in polymeric form.

The process of the invention is suitable for purifying lactams derived from any source. Thus, for example, lactams obtained by Beckmann transformation of cyclic ketoximes, by depolymerization of polyamides prepared from lactams or by washing out polyamides, such as caprolactam, butyrolactam and valerolactam, may be purified according to the present invention. The invention is particularly applicable to the purification of aliphatic lactams which have a 5-, 6-, or 7-membered lactam ring in their structure.

It will be appreciated that various modifications may be made in the invention as described herein without in any way deviating from the scope of the invention as defined in the appended claims.

We claim:

1. A process for producing purified lactams from a crude organic solvent solution thereof contaminated with substantially ionogenic impurities which consists essentially of the steps of removing said organic solvent from said crude lactams and forming an aqueous solution of said crude lactams substantially free from organic solvent, wherein the concentration of said crude lactams in said aqueous solution is between 5% and 60% by weight, treating said aqueous solution with an ion exchange resin selected from the group consisting of strongly acidic cation exchange resins and strongly basic anion exchange resins, removing and collecting said aqueous solution from said anion exchange resin and removing the water therefrom under reduced pressure to recover water-white purified lactams and regenerating said ion exchange resin after exhaustion thereof so as to permit its re-use in said process.

2. A process for producing purified lactams from a crude organic solvent solution thereof contaminated with substantially non-ionogenic impurities; subjecting said organic solvent solution to treatment with a reagent selected from the group consisting of reducing and oxidizing reagents, thereafter removing said organic solvent by distillation, forming an aqueous solution of said lactams substantially free from organic solvent, having a concentration between 5% and 60% by weight, and treating said aqueous solution with an ion exchange resin selected from the group consisting of strongly acidic cation exchange resins and strongly basic anion exchange resins, removing and collecting said aqueous solution from said anion exchange resin and removing the water therefrom under reduced pressure to recover water-white purified lactams, and regenerating said ion exchange resin after exhaustion thereof, so as to permit reuse of said ion exchange resin in said process.

3. The process of claim 2 wherein said oxidizing agent is potassium permanganate.

4. The process of claim 2 wherein said reducing agent is sodium metasulfite.

5. The process of claim 1 wherein said columns of ion exchange resin comprises at least one column of a cation exchange resin and at least one column of an anion exchange resin.

6. The process of claim 1 wherein prior to passing said aqueous solution through said ion exchange resins, said aqueous solution is passed through a column containing activated carbon.

7. The process of claim 1 wherein said lactam is selected from the group consisting of lactams having 5-, 6-, and 7-membered lactam rings.

8. The process of claim 7 wherein said lactam is E-caprolactam.

9. The process of claim 7 wherein said lactam is delta-methylvalerolactam.

10. The process of claim 7 wherein said lactam is delta-valerolactam.

11. The process of claim 7 wherein said lactam is butyrolactam.

12. The process of claim 1 wherein said concentration is between 10% and 30% by weight of said crude lactam.

References Cited in the file of this patent

UNITED STATES PATENTS

| | | |
|---|---|---|
| 2,692,878 | Kahr | Oct. 26, 1954 |
| 2,758,991 | Kretzers et al. | Aug. 14, 1956 |

FOREIGN PATENTS

| | | |
|---|---|---|
| 504,774 | Belgium | Aug. 14, 1952 |
| 1,087,137 | France | Aug. 18, 1954 |
| 748,291 | Germany | Oct. 3, 1944 |
| 748,460 | Germany | Nov. 3, 1944 |

UNITED STATES PATENT OFFICE
CERTIFICATE OF CORRECTION

Patent No. 2,828,307                                      March 25, 1958

Johannes C. Soeterbroek et al.

It is hereby certified that error appears in the printed specification of the above numbered patent requiring correction and that the said Letters Patent should read as corrected below.

Column 6, line 58, and column 7, line 1, for "anion", each occurrence, read -- ion --.

Signed and sealed this 7th day of October 1958.

(SEAL)
Attest:

KARL H. AXLINE                                             ROBERT C. WATSON
Attesting Officer                                         Commissioner of Patents